United States Patent
Tamiya

(10) Patent No.: US 12,259,007 B2
(45) Date of Patent: Mar. 25, 2025

(54) ALLOY MEMBER, SLIDING MEMBER, AND APPARATUS

(71) Applicant: CANON KABUSHIKI KAISHA, Tokyo (JP)

(72) Inventor: Hirotomo Tamiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 17/681,620

(22) Filed: Feb. 25, 2022

(65) Prior Publication Data

US 2022/0275835 A1 Sep. 1, 2022

(30) Foreign Application Priority Data

Mar. 1, 2021 (JP) .................. 2021-031424
Jan. 7, 2022 (JP) .................. 2022-001735

(51) Int. Cl.
*F16C 33/12* (2006.01)
*B05D 1/02* (2006.01)
(Continued)

(52) U.S. Cl.
CPC .............. *F16C 33/128* (2013.01); *B05D 1/02* (2013.01); *B05D 3/067* (2013.01); *B32B 15/04* (2013.01);
(Continued)

(58) Field of Classification Search
CPC ...... F16C 2204/20; F16C 33/128; B05D 1/02; B05D 3/067; C22C 23/00; C22C 23/02; C22C 23/04; C22C 24/00; C22C 28/00; C25D 7/10; C25D 9/12; C25D 11/30; B32B 15/04; B32B 15/043; B32B 15/08; C23C 26/00; Y10T 428/12556; Y10T 428/12569; Y10T 428/12583; Y10T 428/12729; Y10T 428/24942; Y10T 428/2495; Y10T 428/24959; Y10T 428/12472; Y10T 428/24967; Y10T 428/24992; Y10T 428/12451; Y10T 428/26; Y10T 428/263; Y10T 428/264; Y10T 428/265;
(Continued)

(56) References Cited

U.S. PATENT DOCUMENTS

| 3,345,276 A | 10/1967 | Munroe |
| 2020/0190636 A1 | 6/2020 | Sakamoto |
| 2022/0010412 A1 | 1/2022 | Sakamoto |

FOREIGN PATENT DOCUMENTS

| CN | 1653212 A | 8/2005 |
| CN | 102762768 A | 10/2012 |

(Continued)

OTHER PUBLICATIONS

Machine Translation, Kenju, JP 2019-056175 A, Apr. 11, 2019. (Year: 2019).*

*Primary Examiner* — Michael E. La Villa
(74) *Attorney, Agent, or Firm* — Canon U.S.A., Inc. I.P. Division

(57) ABSTRACT

An alloy member includes a substrate formed of an alloy containing Mg and Li, a first layer which is disposed on the substrate and contains an inorganic fluoride, and a second layer which is disposed on the first layer and includes a cured product of a resin, the substrate, the first layer, and the second layer being stacked together, in which a surface of the first layer on the side opposite the substrate has an irregular structure.

11 Claims, 6 Drawing Sheets

(51) Int. Cl.
  *B05D 3/06*   (2006.01)
  *B32B 15/04*  (2006.01)
  *B32B 15/08*  (2006.01)
  *C22C 23/00*  (2006.01)
  *C22C 23/02*  (2006.01)
  *C22C 23/04*  (2006.01)
  *C22C 24/00*  (2006.01)
  *C22C 28/00*  (2006.01)
  *C23C 26/00*  (2006.01)
  *C25D 7/10*   (2006.01)
  *C25D 9/12*   (2006.01)
  *C25D 11/30*  (2006.01)

(52) U.S. Cl.
  CPC ............ *B32B 15/043* (2013.01); *B32B 15/08* (2013.01); *C22C 23/00* (2013.01); *C22C 23/02* (2013.01); *C22C 23/04* (2013.01); *C22C 24/00* (2013.01); *C22C 28/00* (2013.01); *C23C 26/00* (2013.01); *C25D 7/10* (2013.01); *C25D 9/12* (2013.01); *C25D 11/30* (2013.01); *F16C 2204/20* (2013.01); *Y10T 428/12042* (2015.01); *Y10T 428/12451* (2015.01); *Y10T 428/12472* (2015.01); *Y10T 428/12479* (2015.01); *Y10T 428/12493* (2015.01); *Y10T 428/12556* (2015.01); *Y10T 428/12569* (2015.01); *Y10T 428/12583* (2015.01); *Y10T 428/12729* (2015.01); *Y10T 428/24942* (2015.01); *Y10T 428/2495* (2015.01); *Y10T 428/24959* (2015.01); *Y10T 428/24967* (2015.01); *Y10T 428/24992* (2015.01); *Y10T 428/26* (2015.01); *Y10T 428/263* (2015.01); *Y10T 428/264* (2015.01); *Y10T 428/265* (2015.01)

(58) Field of Classification Search
  CPC ..... Y10T 428/12042; Y10T 428/12479; Y10T 428/12493
  See application file for complete search history.

(56) References Cited

FOREIGN PATENT DOCUMENTS

| | | |
|---|---|---|
| CN | 106715762 A | 5/2017 |
| CN | 107056331 A | 8/2017 |
| CN | 109836171 A | 6/2019 |
| CN | 112080777 A | 12/2020 |
| JP | 2019056175 A | 4/2019 |
| JP | 2020097783 A | 6/2020 |

* cited by examiner

ALLOY MEMBER, SLIDING MEMBER, AND APPARATUS

BACKGROUND OF THE INVENTION

Field of the Invention

The present invention relates to an alloy member, a sliding member, an apparatus, and a method for manufacturing an alloy member.

Description of the Related Art

Magnesium-based alloys are light and have excellent vibration-damping properties and specific strength, and therefore are used in various articles. In recent years, a further reduction in the weight of apparatuses has been required, and magnesium-lithium-based alloys (Mg—Li-based alloys) having lower specific gravity than magnesium-based alloys have been receiving attention. However, lithium is a metal element that is very active, easily ionized, and easily dissolved. Therefore, Mg—Li-based alloys are more easily corroded than magnesium-based alloys in general. Accordingly, it is known to form a film which prevents corrosion on a surface of a Mg—Li-based alloy. Japanese Patent Laid-Open No. 2019-56175 discloses that after a chemical conversion film is formed on a surface of a Mg—Li-based alloy using a treatment solution containing a fluoride, a coating film containing a resin is baked thereon.

However, in the method disclosed in Japanese Patent Laid-Open No. 2019-56175, the adhesion of the chemical conversion film to the alloy is not sufficient, and the chemical conversion film and the coating film peel off in some cases.

SUMMARY OF THE INVENTION

In a first aspect of the present invention, an alloy member includes a substrate formed of an alloy containing Mg and Li, a first layer which is disposed on the substrate and contains an inorganic fluoride, and a second layer which is disposed on the first layer and includes a cured product of a resin, the substrate, the first layer, and the second layer being stacked together, in which a surface of the first layer on the side opposite the substrate has an irregular structure.

In a second aspect of the present invention, a method for manufacturing an alloy member includes a preparation step of preparing a substrate formed of an alloy containing Mg and Li, an arrangement step of arranging a substrate serving as a cathode and the substrate formed of the alloy serving as an anode in a neutral aqueous solution of ammonium fluoride, a voltage application step of applying a voltage between the anode and the cathode to form a first layer which has an irregular structure on a surface thereof and contains an inorganic fluoride on the substrate, a placement step of placing an uncured resin on the irregular structure of the first layer, and a curing step of curing the resin to form a second layer including a cured product of the resin.

Further features of the present invention will become apparent from the following description of exemplary embodiments with reference to the attached drawings.

DESCRIPTION OF THE EMBODIMENTS

Embodiments for carrying out the present invention will be described in detail below with reference to the drawings.

First Embodiment (Layer Structure of Alloy Member)

Figure 1:
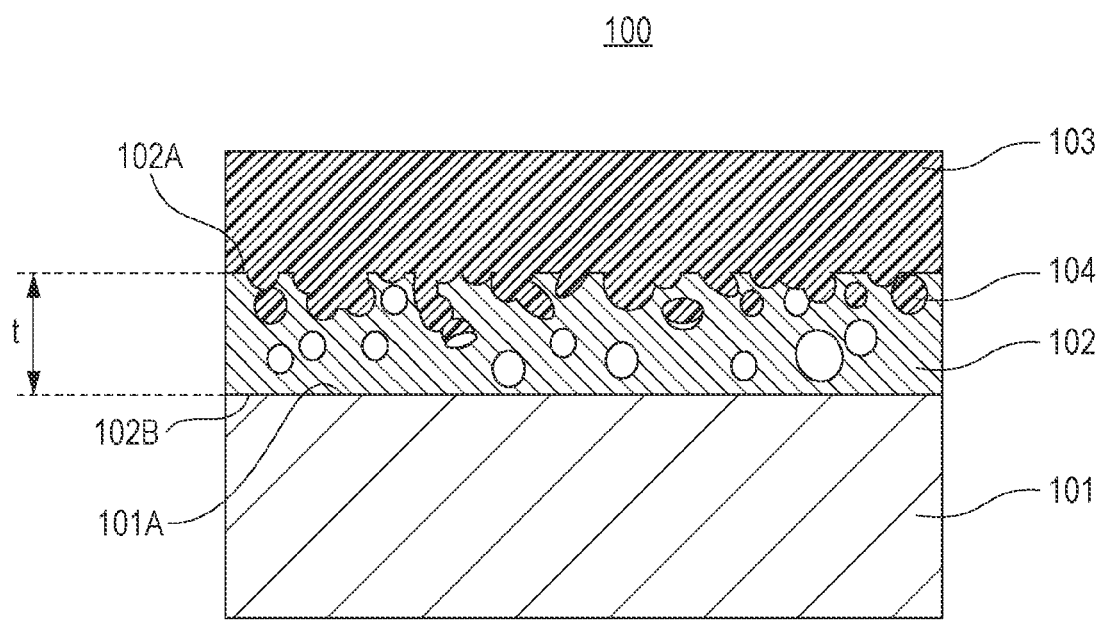
FIG. 1 is a sectional view of an alloy member according to an embodiment.

FIG. 1 is a schematic diagram of an alloy member 100 according to an embodiment and is a sectional view in the stacking direction. The alloy member 100 includes a substrate 101, a first layer 102 disposed on the substrate 101, and a second layer 103 disposed on the first layer, which are stacked together. The application of the alloy member of this embodiment is not particularly limited, and for example, the alloy member can be used as a casing of an apparatus or a sliding member. The alloy member of this embodiment has excellent adhesion between the first layer 102 and the second layer 103 disposed on the substrate 101, and therefore is suitable for use as a sliding member.

The substrate 101 is formed of an alloy containing magnesium (Mg) and lithium (Li).

As the alloy containing Mg and Li, a magnesium-lithium-based alloy (Mg—Li-based alloy) is known. In the present description, the term "Mg—Li-based alloy" refers to an alloy which contains Mg and Li and in which the sum of the content of Mg and the content of Li is 90% by mass or more. Mg—Li-based alloys are lightweight metal materials and have excellent lightweight properties, vibration-damping properties, and specific strength compared with Mg alloys that do not contain Li. The term "excellent vibration-damping properties" means that by rapidly converting vibration energy into heat energy, vibration is quickly damped. Furthermore, the specific strength refers to tensile strength per density, and higher specific density enables further reduction in weight of a member. On the other hand, if the sum of the content of Mg and the content of Li is less than 90% by mass, it may be difficult to reduce weight. In the Mg—Li-based alloy, the content of Li is 0.5% by mass or more and 15% by mass or less. Since the Mg—Li-based alloy becomes lighter as the content of Li increases, a higher content of Li is desirable. However, if the content of Li exceeds 15% by mass, corrosion resistance may be deteriorated. On the other hand, if the content of Li is less than 0.5% by mass, it may be difficult to reduce weight.

Furthermore, in order to adjust the characteristics of the Mg—Li-based alloy, other metal elements may be incorporated in an amount of 10% by mass or less. Specifically, the Mg—Li-based alloy may contain at least one element selected from the first group consisting of Al, Zn, Mn, Si, Ca, Ge, and Be.

For example, the content of aluminum (Al) is preferably 10% by mass or less. From the viewpoint of increasing the strength of the substrate 101, the content of Al may be 1% by mass or more and 10% by mass or less.

Zn, Mn, Si, and Ca can increase the strength of the substrate 101. The content of Zn is preferably 3% by mass or less, and more preferably 0.2% by mass or more and 3% by mass or less. The content of Mn is preferably 0.3% by mass or less, and more preferably 0.1% by mass or more and 0.3% by mass or less. The content of Si is preferably 0.2% by mass or less, and more preferably 0.1% by mass or more and 0.2% by mass or less. The content of Ca is preferably 1.0% by mass or less, and more preferably 0.1% by mass or more and 1.0% by mass or less.

Ge and Be refine crystal grains of the Mg—Li-based alloy and enhance the corrosion resistance of the substrate 101. The content of Ge is preferably 1% by mass or less, and more preferably 0.1% by mass or more and 1% by mass or less. The content of Be is preferably 3% by mass or less, and more preferably 0.04% by mass or more and 3% by mass or less.

The shape of the substrate 101 is not particularly limited as long as the substrate 101 has a first surface 101A. The shape is not limited to a hexahedron, such as a rectangular parallelepiped or a cube, as shown in FIG. 1, but may be a cylinder, a sphere, a prism, a cone, or a tube.

The first layer 102 can be obtained by modifying the surface of the substrate 101. The first layer 102 is a film formed of an inorganic compound including an inorganic fluoride. The inorganic fluoride is, for example, magnesium fluoride ($MgF_2$). The inorganic fluoride of the first layer 102 has as a main component $MgF_2$, and the ratio thereof is 90% by volume or more. Since the inorganic fluoride of the first layer 102 has as a main component $MgF_2$, corrosion of the substrate 101 can be suppressed. The inorganic fluoride of the first layer 102 may include besides $MgF_2$, lithium fluoride (LiF) or an oxide as long as its ratio is 10% by volume or less. The volume ratio of $MgF_2$ in the inorganic fluoride of the first layer 102 can be calculated, for example, on the basis of 2θ-θ measurement in X-ray diffraction analysis.

The second layer 103 can be obtained by placing an uncured resin on the first layer 102 and curing the resin. The second layer 103 includes a cured product of the resin. Although the second layer 103 is disposed at the uppermost surface of the alloy member 100 in FIG. 1, the second layer 103 is not necessarily located at the uppermost surface of the alloy member 100. For example, a film, such as a heat shield film, may be separately provided on the second layer 103 in order to protect the second layer 103.

In existing Mg—Li-based alloys, even when a chemical conversion film and a coating film are formed on a surface of a substrate, it is difficult to obtain sufficient adhesion with respect to the substrate. As a result of thorough studies conducted by the present inventor, it has been found that by forming a fluoride film having an irregular structure and then forming a film including a resin, it is possible to obtain adhesion due to an anchor effect at the interface between the fluoride film and the resin. Furthermore, it has been found that when the fluoride film is a porous film having a plurality of pores, it is possible to obtain sufficient adhesion due to an anchor effect caused by infiltration of the resin into the pores of the fluoride film. It has been found that although the fluoride film is a material that is brittle and has poor abrasion resistance, because of the anchor effect between the fluoride film and the resin, it is possible to achieve hardness and toughness that can withstand shearing force caused by sliding.

Accordingly, the first layer 102 has a first surface 102A and a second surface 102B on the side opposite the first surface 102A, and the first surface 102A has an irregular structure. The term "irregular structure" refers to a structure in which the maximum roughness Rz of the first surface 102A is 1 μm or more. The Rz is preferably 2 μm or more, and more preferably 2 μm or more and 12 μm or less. Note that the second surface 102B is in contact with the first surface 101A of the substrate.

Furthermore, the inorganic fluoride of the first layer 102 has a plurality of pores 104. In the present description, the pores refer to portions where voids having an average circle equivalent diameter of 1 μm or more are recognized when observed with an electron microscope or the like. At least one of the pores 104 can be located in contact with the second layer 103. Since the second layer 103 is obtained by placing an uncured resin on the first layer 102, at least one of the pores 104 located in contact with the second layer 103 is filled with the resin. Since the uncured resin is cured, at least a part of the cured product of the resin is in contact with the inorganic fluoride of the first layer 102 in the cross section in the stacking direction of the alloy member 100. Furthermore, the resin is made to fill the first layer 102 up to a depth of 1 μm or more toward the substrate 101. Since the second layer 103 having the cured product of the resin exhibits an anchor effect with respect to the first layer 102, adhesion of the second layer 103 to the first layer 102 is excellent. From the viewpoint of further enhancing adhesion, at least a part of the cured product of the resin disposed in the pores 104 can be covered with the inorganic fluoride in the cross section in the stacking direction.

Preferably, the pores 104 have a size with an average circle equivalent diameter of 2 μm or more in the cross section in the stacking direction of the alloy member 100. This is because the amount of the cured product of the resin contained in the second layer 103 with which the pores 104 are filled can be increased. More preferably, the average circle equivalent diameter is 5 μm or more. Furthermore, the thickness of the first layer 102 is preferably 5 μm or more, and more preferably 20 μm or more. By setting the thickness to be 20 μm or more, it is possible to increase the number of regions where the anchor effect is exhibited.

Furthermore, when the maximum thickness of the first layer is defined as t, the cured product of the resin disposed in the pores 104 can be disposed up to a position corresponding to 0.8t from the position at which the first layer 102 and the second layer 103 are in contact with each other in the thickness direction. The reason for this is that since the cured product of the resin of the second layer 103 enters deep into the first layer 102, the anchor effect is increased. On the other hand, when the cured product of the resin is disposed up to a position exceeding 0.8t, there is a concern that the substrate 101 and the uncured resin may be brought into contact with each other, and hydrogen gas may be generated from the substrate 101.

In the alloy member described above, since the first surface 102A of the first layer has an irregular structure, an anchor effect is exhibited at the interface with the second layer 103 including the cured product of the resin, and adhesion between the first layer and the second layer is high. Therefore, it is possible to provide an alloy member that is less likely to be corroded than existing alloy members.

(Method for Manufacturing Alloy Member)

A method for manufacturing an alloy member will be described below with reference to FIGS. 2 to 4C.

Figure 2:
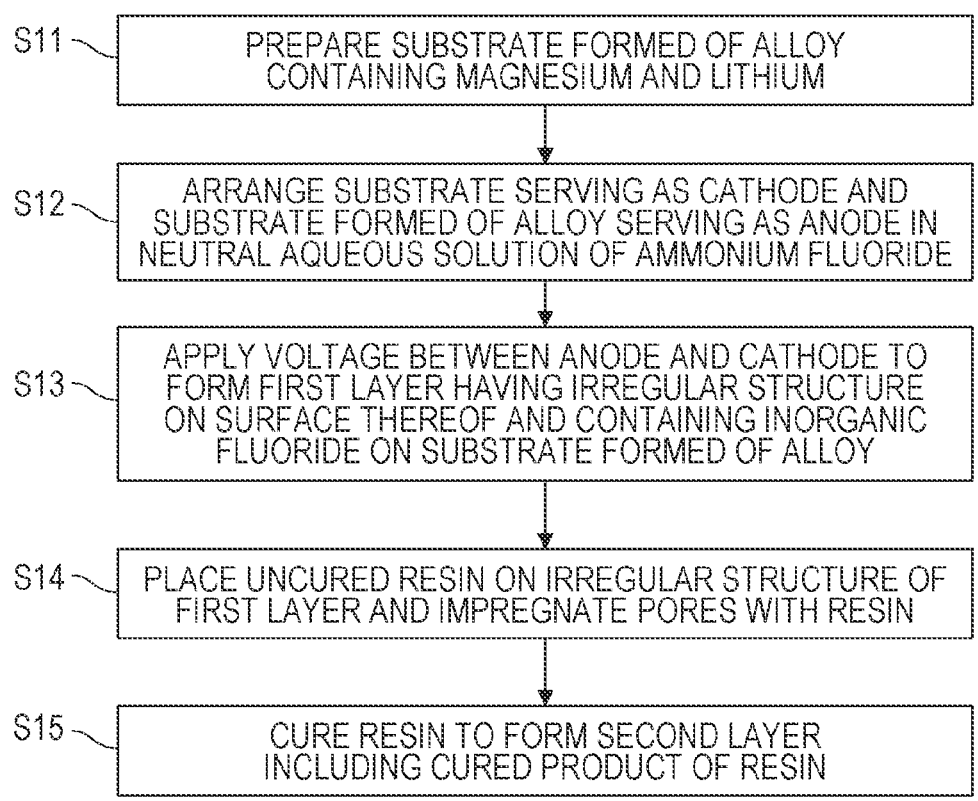
FIG. 2 is a flowchart showing a manufacturing process of an alloy member according to an embodiment.
Figure 3:
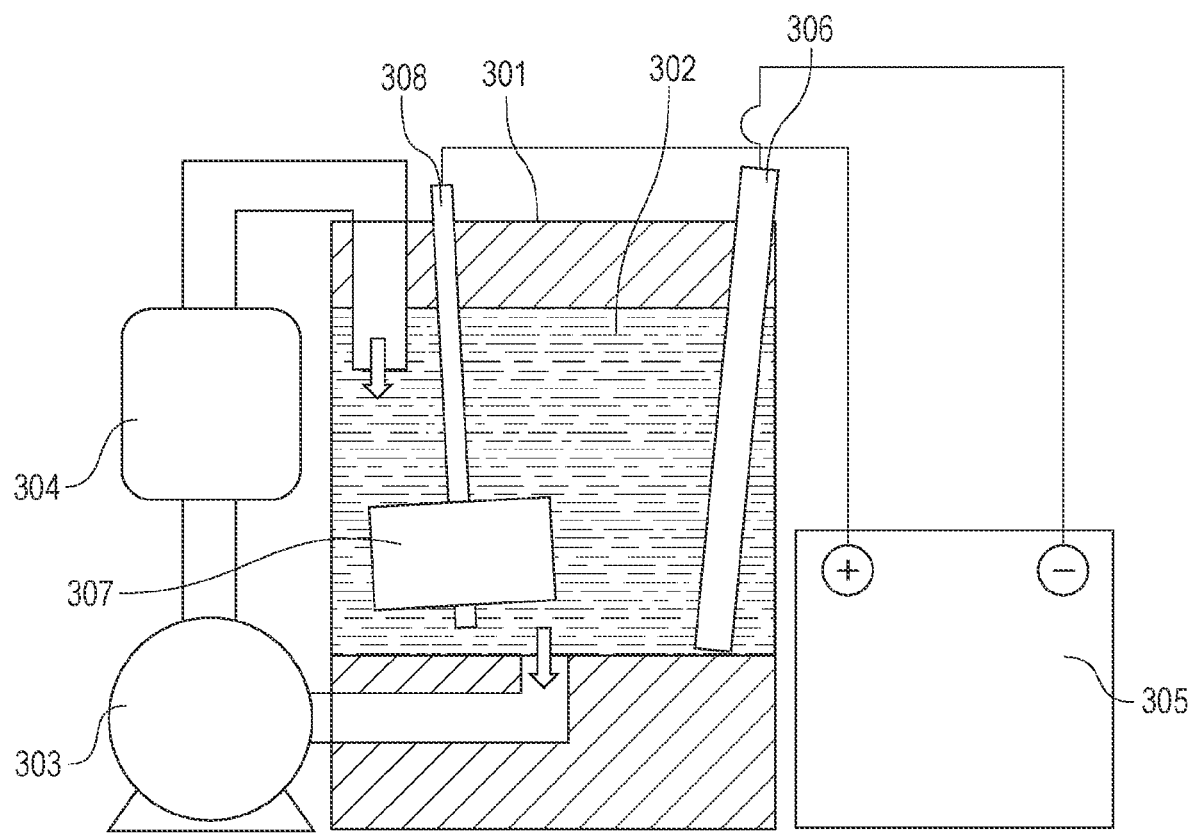
FIG. 3 is a schematic diagram of an anodizing apparatus for forming a first layer of an alloy member.
Figure 4A:
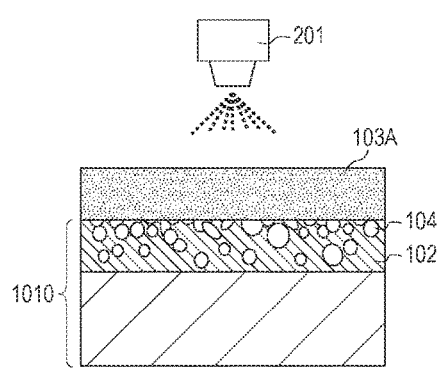
FIG. 4A is a schematic diagram showing an embodiment of a step of forming a second layer of an alloy member.
Figure 4B:
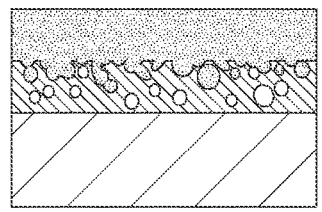
FIG. 4B is a schematic diagram showing an embodiment of a step of forming a second layer of an alloy member.
Figure 4C:
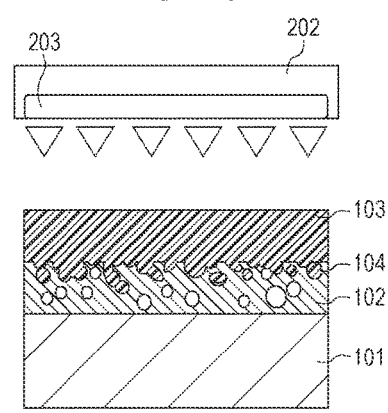
FIG. 4C is a schematic diagram showing an embodiment of a step of forming a second layer of an alloy member.

FIG. 2 is a flowchart showing a manufacturing process of an alloy member. FIG. 3 is a schematic diagram of an anodizing apparatus for forming a first layer of an alloy member. FIGS. 4A to 4C are each a schematic diagram illustrating a step of forming a second layer of an alloy member.

First, a substrate formed of a magnesium-lithium-based alloy (Mg—Li-based alloy) is prepared as a substrate 307 formed of an alloy containing magnesium (Mg) and lithium (Li) (S11, preparation step). From the substrate formed of a Mg—Li-based alloy, oxide layers and segregation on the surface thereof are removed by degreasing, washing with water, etching, or the like, depending on the state of the substrate. An example of the removal method will be described below. A conducting and holding jig 308 made of the same material as the substrate 307 is connected to the substrate 307. Specifically, connection is performed by bending the conducting and holding jig 308 so as to clamp the substrate 307. By immersing the substrate 307 and the conducting and holding jig 308 in nitric acid (concentration: 3 to 5% by mass), acid washing is performed to remove oxide layers. As the acid, hydrochloric acid, sulfuric acid, or the like may be used instead of nitric acid as long as it can dissolve oxide layers on the surface. After acid washing, the substrate 307 and the conducting and holding jig 308 are washed with pure water. Then, the substrate 307 and the conducting and holding jig 308 are immersed in pure water heated at 90 to 99° C., retrieved from the pure water, and dried.

Next, a method of forming a first layer containing an inorganic fluoride will be described with reference to FIG. 3.

An anodizing apparatus 309 includes a treatment tank 301 which stores an electrolyte 302, and also includes a pump 303 and a filter 304 for circulating and stirring the electrolyte 302 from the bottom to the top of the treatment tank 301 through a pipe. Furthermore, the anodizing apparatus 309 includes a power source 305, and the cathode of the power source 305 is electrically connected to a cathode electrode 306 immersed in the electrolyte 302 in the treatment tank 301. A material having low reactivity with the electrolyte may be used as the cathode electrode 306, and for example, carbon, platinum, titanium, SUS, or the like can be used. Furthermore, since the anode of the power source 305 is connected to the conducting and holding jig 308 connected to the substrate 307, the substrate 307 and the conducting and holding jig 308 serve as an anode electrode.

In order to form a first layer 102 which is a fluoride film containing an inorganic fluoride on the substrate 307 formed of a Mg—Li-based alloy, a neutral aqueous solution of ammonium fluoride is arranged as the electrolyte 302 in the treatment tank 301 (S12, arrangement step). The concentration of the neutral aqueous solution of ammonium fluoride is preferably 200 g/L to a saturated concentration, and in order to highly fluorinate the surface of the substrate 307, a high concentration is preferable. The aqueous solution of the electrolyte 302 is neutral, and the pH is preferably 6.0 or more and 8.0 or less. In an acidic condition with a reduced pH, hydrogen fluoride is generated. On the other hand, in an alkaline condition with an increased pH, at the anode, oxidation reaction not only with fluorine but also with oxygen occurs. As a result, the content of fluorine in the first layer 102 is decreased. The pH is more preferably in the range of 7.0 to 7.5. When the pH is in this range, a higher voltage is easily applied, and therefore, a thick first layer 102 can be easily formed. Note that since the temperature of the electrolyte 302 is raised by the pump, it is desirable to perform temperature control with a chiller or the like. The preferable temperature of the electrolyte is −20° C. to 60° C. Furthermore, stirring by bubbling may also be used for stirring the solution. Furthermore, a filter may be provided in order to capture lithium fluoride (LiF) generated in the solution.

After completion of connection to the power source 305, a voltage is applied between the anode electrode (the substrate 307 and the conducting and holding jig 308) and the cathode electrode 306 (S13, voltage application step). Here, the thickness of the first layer 102 is proportional to the total amount of current (coulomb amount) flowing through a unit area of the substrate 307. A desirable condition is that a current of 117 coulombs or more per 10 $cm^2$ is passed. Thus, the thickness of the first layer becomes 20 μm or more, and a fluoride film having sufficient corrosion resistance can be formed.

Furthermore, in order to improve the anchor effect with the second layer, which will be described later, large irregularities and large pores can be provided in the first layer. In order to increase the size of irregularities and pores, for example, a high voltage is applied. Specifically, by increasing the set current value and decreasing the solution concentration, a higher voltage can be applied, and large irregularities and pores can be formed. Furthermore, by increasing the temperature of the solution, larger irregularities and pores can be obtained.

Subsequently, washing with water and drying are performed, the conducting and holding jig 308 is detached from the substrate 307, and thereby a member 1010 in which a first layer (fluoride film) 102 containing $MgF_2$ as an inorganic fluoride is formed can be obtained.

Next, steps of forming a second layer will be described with reference to FIGS. 4A to 4C. FIG. 4A shows a coating step of placing an uncured resin on an irregular structure of the first layer, FIG. 4B shows an impregnation step of impregnating pores of the first layer with the uncured resin, and FIG. 4C shows a coating film curing step of curing the resin.

In the coating step, a coating material 103A including an uncured resin is placed on the surface of the member 1010 having the first layer formed thereon (S14, placement step). In order to make the thickness of the second layer 103 uniform, the coating material 103A is desirably applied uniformly to the first surface 102A of the first layer 102. As a method of applying the coating material 103A, for example, a spray method in which a coating material is sprayed by atomized air from an air spray gun 201, as shown in FIG. 4A, may be used. As other methods, known methods in which a coating material is uniformly applied, such as spin coating, blade coating, die coating, dipping, and air knife coating, can be used. The coating material is applied such that the thickness of the second layer 103 after curing is 5 μm or more and 100 μm or less. When the thickness of the second layer is less than 5 μm, there is a concern that the irregular structure of the first layer 102 may not be sufficiently covered unless the height of irregularities of the irregular structure is decreased. In such a case, sufficient abrasion resistance may not be obtained. On the other hand, when the thickness is more than 100 μm, unevenness in film thickness may be increased, and there is a concern that portions with excessively high contact pressure may occur. In such a case, abrasion powder may be likely to be generated.

As the coating material 103A, an organic coating material capable of forming a second layer 103 which is a coating film from a liquid coating material can be used. The viscosity of the coating material may be selected such that impregnation can be easily achieved in the subsequent impregnation step. The coating material may be either a photocurable coating material or a thermosetting coating material. As the photocurable coating material, for example, a UV curable hard coat material (manufactured by Nippon Paint Industrial Coatings Co., Ltd.: LUCIFRAL NAG-1000) can be used. It is also possible to add a lubricant component to a photocurable coating material. As the lubricant component, for example, an acrylic comb-shaped graft polymer (manufactured by Toagosei Co., Ltd.: SYMAC US270) can be used. Introduction of silicone chains is facilitated through the acrylic main chain, and by modifying the surface of the coating film, lubricity can be improved. The lubricant component can be incorporated at a ratio of 5% by mass or more and 20% by mass or less. At less than 5% by mass, the effect as the lubricant component may be decreased. At more than 20% by mass, the hardness of the photocurable coating material is decreased, and abrasion resistance and adhesion of the coating film may be deteriorated in some cases.

The coating material 103A desirably does not contain a filler. When a filler is contained, abrasion is likely to occur in the case where the filler falls off from a finished product. On the other hand, when a filler is not contained, abrasion powder is not likely to be generated, and the finished product can be suitably used in an optical apparatus and a precision apparatus. Furthermore, the finished product can also be suitably used in a sliding member.

In the impregnation step, pores 104 of the first layer are impregnated with the uncured resin (S14). Since the first layer 102 has communicating fine pores, the coating material 103A including the uncured resin permeates by capillarity over time. In a coating material having a high viscosity, it is better to cure the resin after allowing it to stand for a certain time. When allowing it to stand for a certain time, heating may be performed at a temperature of 100° C. or lower. Furthermore, a vacuum may be drawn.

In the impregnation step, when a vacuum is drawn for a long time (specifically, one hour or more), foaming may occur in some portions of the coating material. The reason for this is assumed to be that the moisture, solvent, and organic substances contained in the coating material react with Li of the Mg—Li-based alloy to generate hydrogen gas. Accordingly, although the anchor effect is increased by performing impregnation with the coating material deeply toward the substrate, it is not desirable to perform impregnation with the coating material up to a position in contact with the substrate. Therefore, when the maximum thickness of the first layer is defined as t, the resin with which the pores 104 of the first layer 102 is filled is desirably disposed up to a position corresponding to 0.8t from the position at which the first layer 102 and the second layer 103 are in contact with each other.

In the coating film curing step, by applying light and/or heat to the applied coating material 103A, a second layer 103 including a cured product of the resin is formed (S15). In the case where the resin contained in the coating material 103A is a photocurable resin, the coating material 103A is cured by irradiation with ultraviolet light (UV) from an ultraviolet curing device 202. A predetermined amount of UV exposure is required to cure a coating material. The amount of UV exposure can be obtained from the product of the UV intensity and the irradiation time. Furthermore, since the UV intensity depends on the distance from an ultraviolet lamp 203 to the coating material, when the distance is increased, the irradiation time needs to be increased. $MgF_2$ which is a main component of the first layer 102 has a transmittance of 90% or more in the wavelength range of 200 nm or more and 4,000 nm or less. Therefore, UV easily reaches the coating material 103A impregnated in the pores 104 of the first layer 102, and the resin is cured by photopolymerization reaction. Therefore, high adhesion is exhibited between the first layer and the second layer due to the strong anchor effect. In the case where the resin contained in the coating material is a thermosetting resin, the coating material 103A is preferably cured at a temperature of 120° C. or lower. When the temperature is higher than 120° C., the hardness of the Mg—Li-based alloy may be decreased.

According to the method for manufacturing an alloy member described above, it is possible to provide an alloy member in which, since the first surface 102A of the first layer has an irregular structure, an anchor effect is exhibited at the interface with the second layer 103 including the cured product of the resin, and adhesion between the first layer and the second layer is high. Therefore, it is possible to provide an alloy member that is less likely corroded than existing alloy members.

(Optical Apparatus/Imaging Apparatus)

Figure 5:
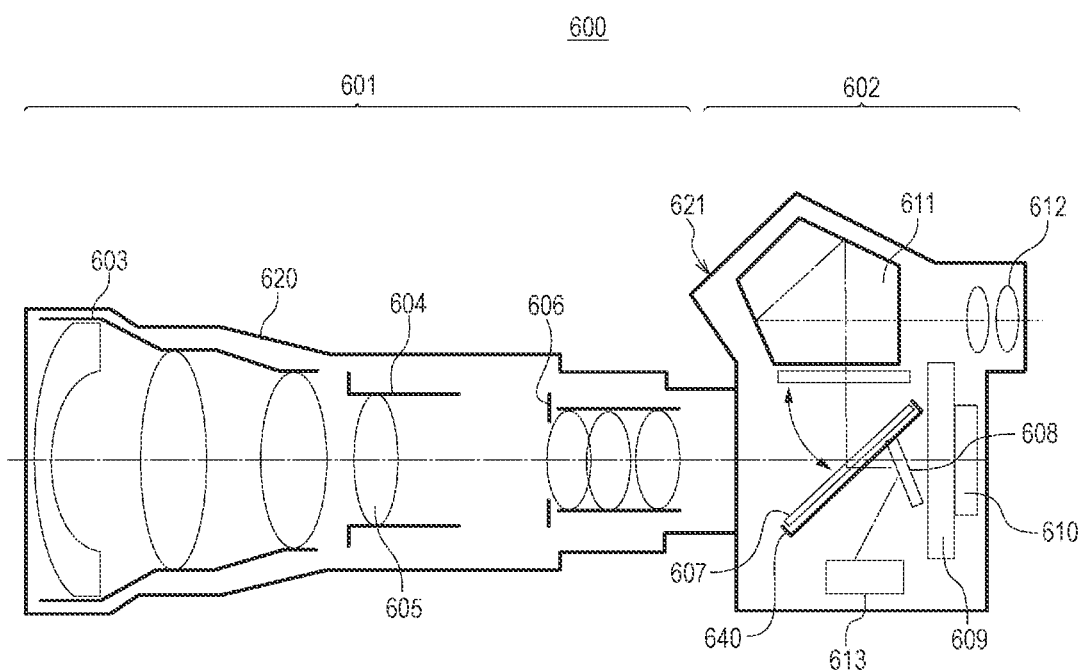
FIG. 5 is a schematic diagram showing an imaging apparatus according to an embodiment.

FIG. 5 illustrates the structure of a single-lens reflex digital camera 600 as an imaging apparatus, which is an example of an apparatus. In FIG. 5, although a camera body 602 and a lens barrel 601, which is an optical apparatus, are connected together, the lens barrel 601 is a so-called interchangeable lens that is detachably attached to the camera body 602. Light from an object passes through an optical system including a plurality of lenses 603 and 605, which are examples of a component, disposed on the optical axis of an imaging optical system in a casing of the lens barrel 601 and is received by an imaging device for photographing. Here, the lens 605 is supported by an inner barrel 604 and movably supported for focusing and zooming with respect to an outer barrel of the lens barrel 601.

During an observation period before photographing, light from the object is reflected by a main mirror 607, which is an example of a component, in a casing 621 of the camera body and transmitted through a prism 611, and then a captured image is displayed to the photographer through a finder lens 612. The main mirror 607 is, for example, a half mirror, and the light transmitted through the main mirror is reflected by a sub-mirror 608 toward an AF (autofocus) unit 613. The reflected light is used, for example, for measurement of distance. The main mirror 607 is mounted and supported on a main mirror holder 640 by bonding or the like. During photographing, the main mirror 607 and the sub mirror 608 are moved out of the optical path by using a driving mechanism (not shown), a shutter 609 is opened, and the captured light image incident from the lens barrel 601 is focused on an imaging device 610. Furthermore, a diaphragm 606 is configured to change the brightness and the depth of focus during photographing by changing the aperture area. The alloy member 100 can be used as at least a portion of a moving part of the lens barrel 601, a moving part of the camera body 602, or a mount (not shown) which is slid when the lens barrel 601 and the camera body 602 are attached and detached and serves as a connecting surface. Furthermore, the alloy member 100 can be used as at least a portion of the casing 621 of the camera body or a casing 620 of the lens barrel 601. The casings 620 and 621 each may be formed of only the alloy member 100. Since the alloy member 100 of the present disclosure is light and has excellent corrosion resistance and abrasion resistance, it is possible to provide an imaging apparatus which is lighter and has more excellent durability than existing imaging apparatuses.

The single-lens reflex digital camera has been described as an example of the imaging apparatus. However, the present disclosure is not limited thereto. The imaging apparatus may be a smartphone, a mirrorless interchangeable camera, or a compact digital camera.

(Electronic Apparatus)

Figure 6:
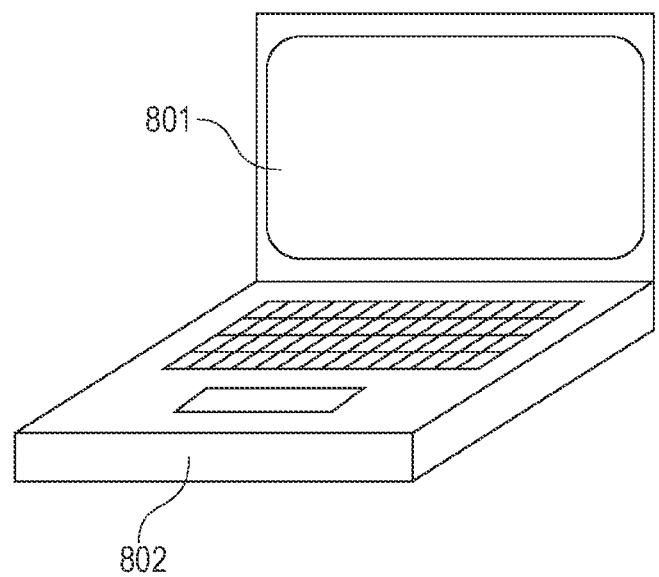
FIG. 6 is a schematic diagram showing an electronic apparatus according to an embodiment.

FIG. 6 illustrates the structure of a personal computer as an electronic apparatus, which is an example of an apparatus. In FIG. 6, a personal computer 800 includes a display unit 801 and a main body 802. In a casing (not shown) of the main body 802, an electronic component (not shown), which is an example of a component disposed in a casing, is disposed. The alloy member 100 can be used as at least a portion of the casing of the main body 802. The casing may be formed of only the alloy member 100. Since the alloy member 100 of the present disclosure is light and has excellent corrosion resistance, it is possible to provide a personal computer which is lighter and has more excellent corrosion resistance than existing personal computers.

The personal computer 800 has been described as an example of the electronic apparatus. However, the present disclosure is not limited thereto. The electronic apparatus may be a smartphone or a tablet.

(Moving Object)

Figure 7:
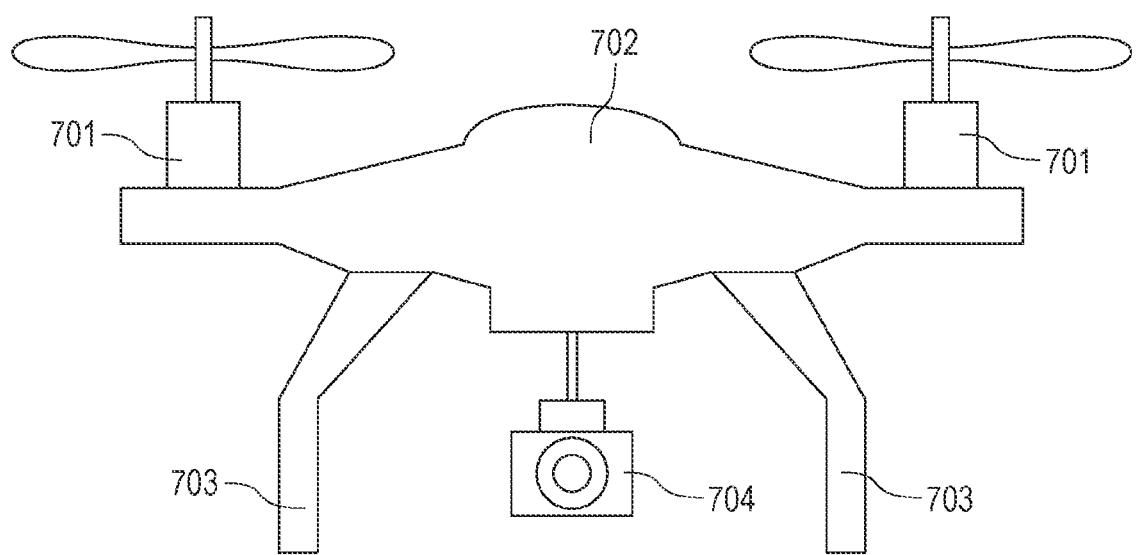
FIG. 7 is a schematic diagram showing a moving object according to an embodiment.

FIG. 7 is a diagram showing an embodiment of a drone as a moving object, which is an example of an apparatus. A drone 700 includes a plurality of driving units 701 and a main body 702 connected to the driving units 701. In the main body 702, a driving circuit (not shown), which is an example of a component, is disposed. The driving units 701 each have, for example, a propeller. As shown in FIG. 7, the main body 702 may be configured so that leg portions 703 are connected thereto or a camera 704 is connected thereto. The alloy member 100 can be used as at least a portion of a casing (not shown) of the main body 702 and the leg portions 703. The casing may be formed of only the alloy member 100. Since the alloy member 100 of the present disclosure has excellent vibration-damping properties and corrosion resistance, it is possible to provide a drone having more excellent vibration-damping properties and corrosion resistance than existing drones.

EXAMPLES

The present invention will be described below with reference to Examples. First, a manufacturing method of an alloy member in Examples and Comparative Examples will be described.

(Manufacturing of Alloy Member)

Example 1

First, as a material for a substrate formed of an alloy containing magnesium and lithium, a cylindrical billet of Ares (composition Mg-9% Li-1% Zn-4% Al, manufactured by Amli Materials Technology Co., Ltd.) with a diameter φ of 90 mm and a thickness of 10 mm was prepared. By cutting the cylindrical billet into a ring shape with an outside diameter φ of 66 mm, an inside diameter φ of 54 mm, a thickness of 4 mm, a ring-shaped substrate formed of an alloy containing magnesium and lithium was obtained.

Next, by using an anodizing apparatus 309 shown in FIG. 3, a first layer containing an inorganic fluoride having a plurality of pores was formed on the ring-shaped substrate. Specifically, the ring-shaped substrate was connected to a conducting and holding jig 308 made of Ares, and the ring-shaped substrate and the conducting and holding jig 308 were used as an anode electrode. Carbon was used as a cathode electrode 306. As an electrolyte 302, a neutral aqueous solution of ammonium fluoride (pH=7.0) with a concentration of 230 g/L was used. The cathode electrode 306 and the anode electrode were arranged in the neutral aqueous solution of ammonium fluoride. Subsequently, a voltage was applied between the cathode electrode 306 and the anode electrode. At this time, the temperature of the electrolyte 302 was controlled to be 40° C.±2° C.

In a power source 305, the current value was set to 4 A, and by monitoring an integral value of the current (coulomb amount) after application of the voltage, a current of 119 coulombs per 10 cm$^2$ was passed.

A second layer including a cured product of a resin was formed on the substrate having the first layer formed thereon, using the steps shown in FIGS. 4A to 4C. Specifically, first, as a coating material 103A, a coating material in which 90% by mass of a UV curable material, LUCIFRAL (manufactured by Nippon Paint Industrial Coatings Co., Ltd., type: NAG-1000) and 10% by mass of an acrylic silicone, SYMAC (manufactured by Toagosei Co., Ltd., type: US270) were mixed was prepared. The coating material 103A was applied onto the first layer using an air spray gun 201. After the application, by allowing it to stand for 30 minutes, pores of the first layer were impregnated with the coating material 103A. Then, using an ultraviolet curing device 202 with a wavelength of 365 nm and a UV lamp light intensity of 400 W, light irradiation was performed such that the UV intensity measured by a UV intensity meter was in the range of 40 mW/cm$^2$ to 80 mW/cm$^2$ to cure the resin of the coating film, and thereby, an alloy member of Example 1 was obtained.

Examples 2 to 8

In Examples 2 to 8, by monitoring an integral value of the current (coulomb amount) after application of the voltage, a current of 117 coulombs or more per 10 cm$^2$ was passed. By changing the coulomb amount, the thickness of the first layer was changed from Example 1.

Furthermore, in Examples 2 to 8, by changing the amount of ejection from the air spray gun 201 and the impregnation time after application, the thickness of the second layer and the amount of resin disposed in the pores of the first layer were changed.

Comparative Example 1

In Comparative Example 1, conditions for forming the first layer were different from those of Example 1. A first layer was formed by performing chemical conversion treatment on the substrate. Specifically, the substrate was immersed in an acidic solution of ammonium fluoride with a concentration of 20 g/L at a temperature of 60° C. for 2 minutes. In the other steps, by the same procedure as that of Example 1, an alloy member of Comparative Example 1 was obtained.

Comparative Example 2

In Comparative Example 2, conditions for forming the first layer were different from those of Example 1. A first layer was formed by performing micro-arc oxidation treatment on the substrate. Specifically, using sodium silicate with a concentration of 10 g/L as an electrolyte at a temperature of 25° C. and using a pulsed power supply, constant-current electrolysis was performed under the conditions of a positive pulse width of 1 ms, an on/off time ratio of 0.2, and an average current density of 200 A/m². The upper limit voltage was set to 360 V, and after reaching the upper limit voltage, electrolysis was performed with a constant voltage of 360 V.

(Evaluation of Alloy Member)

Evaluation methods and results thereof for Examples 1 to 8 and Comparative Examples 1 and 2 will be described below.

(Maximum Thickness of First Layer and Second Layer)

The maximum thickness of the first layer and the maximum thickness of the second layer were measured by an eddy current method, using a film thickness meter (manufactured by Sanko Electronic Laboratory Co., Ltd., SWT-9000) and SWT probe N for film thickness meter (manufactured by Sanko Electronic Laboratory Co., Ltd., Fe-0.6). Zero-point calibration was performed with respect to a polished surface of the substrate, and the maximum thickness of each of the first layer and the second layer was measured.

(Size of Pores of First Layer)

The size of the pores of the first layer was measured using a scanning electron microscope (SEM, manufactured by Carl Zeiss Microscopy, Sigma 500VP), under the conditions of a voltage of 5 kV, a work distance of 7.0 mm, and an aperture size of 60 μm. First, in a field of view at a magnification of 200 times (570×420 μm), an area including the largest pore was selected, and then in a field of view at a magnification of 1,000 times (110×80 μm), the size of the pore was measured. The shape of the pore at each of 10 points measured was approximated to a circle by image processing, and a circle equivalent diameter was obtained. The average value of measured values was rounded to a whole number.

(Impregnation Depth of Resin in First Layer)

The impregnation depth of the resin, i.e., the length of the resin infiltrated into the first layer in the thickness direction was measured using a scanning electron microscope (SEM, manufactured by Carl Zeiss Microscopy, Sigma 500VP). First, in a field of view at a magnification of 200 times (570×420 μm), a position at which the resin had infiltrated deepest was selected. Then, in a field of view at a magnification of 1,000 times (110×80 μm), the impregnation depth from the outermost surface of the first layer toward the substrate was obtained from an EDX image showing spectra of fluorine, magnesium, and carbon, by measuring the depth at which carbon entered inside the image of fluorine and magnesium.

The results thereof are summarized in Table 1.

TABLE 1

| | Thickness of first layer t (μm) | Pore size ϕ (μm) | Impregnation depth of resin (μm) | Impregnation depth of resin (relative value) | Thickness of second layer (μm) |
|---|---|---|---|---|---|
| Example 1 | 44 | 10 | 15 | 0.34t | 11 |
| Example 2 | 44 | 12 | 19 | 0.43t | 8 |
| Example 3 | 43 | 8 | 5 | 0.12t | 13 |
| Example 4 | 45 | 8 | 2 | 0.04t | 5 |
| Example 5 | 45 | 10 | 40 | 0.89t | 10 |
| Example 6 | 20 | 2 | 5 | 0.25t | 15 |
| Example 7 | 20 | 2 | 17 | 0.85t | 10 |
| Example 8 | 3 | 1 | 1 | 0.33t | 10 |

TABLE 1-continued

| | Thickness of first layer t (μm) | Pore size ϕ (μm) | Impregnation depth of resin (μm) | Impregnation depth of resin (relative value) | Thickness of second layer (μm) |
|---|---|---|---|---|---|
| Comparative Example 1 | 3 | — | — | — | 11 |
| Comparative Example 2 | 25 | 10 | 10 | 0.40t | 10 |

In an abrasion resistance test and a durability test at constant temperature and humidity conducted on the alloy members of Examples 1 to 8 and Comparative Examples 1 and 2, evaluation methods and results thereof will be described below.

(Abrasion Resistance Test)

Abrasion resistance was evaluated using a friction player (manufactured by RHESCA Co., Ltd., FPR-2100). The measurement was performed under the conditions in which the load weight was set at 200 gf, and by using a ball with 0³⁄₁₆ inch made of brass whose surface was treated with Ni—P plating, evaluation was performed in a reciprocating sliding test mode, at a reciprocating speed of 40 mm/sec and a reciprocating width of 20 mm. In the sliding portion, sliding between the surface and the ball occurs. Under initial conditions in which the maximum contact pressure obtained from the Hertz formula was 730 MPa and the contact surface radius was 36 μm, after sliding for 26,000 reciprocating cycles, sliding traces were observed and compared.

In the evaluation results, the case where traces of abrasion powder were not confirmed by visual observation at the edge of the sliding portion was evaluated as A; the case where peeling off of the second layer, i.e., coating film, was not confirmed in all regions of sliding traces was evaluated as B; and the case where peeling off of the second layer was confirmed was evaluated as C.

(Durability Test at Constant Temperature and Humidity)

In the durability test at constant temperature and humidity, the alloy members of Examples 1 to 8 and Comparative Examples 1 and 2 were placed in a constant temperature and humidity chamber at a temperature of 65° C. and a humidity of 95% and left to stand for 1,000 hours, and the presence or absence of a change in appearance was checked. The appearance was evaluated by visual observation and microscopic observation at magnifications of 50 times and 200 times. The case where no change occurred before and after the durability test was evaluated as A, and the case where changes occurred before and after the durability test was evaluated as C.

(Comprehensive Evaluation)

The case where two items, out of the two, were evaluated as A was denoted by A, the case where at least one item was evaluated as C was denoted by C, and the other case was denoted by B. A and B were considered to be good, and C was considered to be poor.

The results thereof are summarized in Table 2.

TABLE 2

| | Abrasion resistance test | Durability test at constant temperature and humidity | Comprehensive evaluation |
|---|---|---|---|
| Example 1 | A | A | A |
| Example 2 | A | A | A |
| Example 3 | A | A | A |

TABLE 2-continued

| | Abrasion resistance test | Durability test at constant temperature and humidity | Comprehensive evaluation |
|---|---|---|---|
| Example 4 | A | A | A |
| Example 5 | B | A | B |
| Example 6 | A | A | A |
| Example 7 | B | A | B |
| Example 8 | B | A | B |
| Comparative Example 1 | C | C | C |
| Comparative Example 2 | B | C | C |

The results of Table 2 show that in all of the alloy members of Examples 1 to 8, the second layer did not peel off in the abrasion resistance test, and no change in appearance was confirmed before and after the durability test at constant temperature and humidity.

Furthermore, in Examples 1 to 4 and 6, the width of sliding traces was 300 μm or less, and abrasion powder generation was not confirmed. On the other hand, in Examples 5 and 7, abrasion powder was generated. The reason for this is considered to be that since the impregnation depth of resin exceeded 0.8t, hydrogen gas, although very small in amount, was generated. Furthermore, in Example 8, it is considered that since the pore size was small, the anchor effect was insufficient, and adhesion between the second layer and the first layer was low compared with other Examples.

In Comparative Example 1, since the first layer was a chemical conversion film, it was not possible to form pores of 1 μm or more, and also, a first layer with a sufficient thickness was not obtained. Accordingly, the anchor effect was weak, and adhesion was insufficient. As a result, abrasion resistance was evaluated to be C. Furthermore, after the durability test at constant temperature and humidity, poor appearance occurred.

Furthermore, in Comparative Example 2, since the first layer was an oxide layer, water absorption occurred in the substrate after the durability test at constant temperature and humidity, and poor appearance due to corrosion occurred.

In addition, the substrate of Example 1 was changed, instead of Ares, to billets with a composition 1, a composition 2, and a composition 3 shown below. In all cases, the result of the abrasion resistance test was A, and the result of the durability test at constant temperature and humidity was A.

(Composition 1): Mg—12% Li—0.35% Ca—3% Al—0.1% Mn—0.3% Ge—0.04% Be
(Composition 2): Mg—14% Li—0.5% Ca—6% Al—0.1% Mn
(Composition 3): Mg—7% Li—1% Zn—7% Al
(Composition 4): Mg—14% Li—0.3% Ca—3% Al—0.15% Mn According to the present disclosure described above, it is possible to provide an alloy member in which, since the first surface 102A of the first layer has an irregular structure, an anchor effect is exhibited at the interface with the second layer 103 including the cured product of the resin, and adhesion between the first layer and the second layer is high. Therefore, it is possible to provide an alloy member that is less likely corroded than existing alloy members.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-031424 filed Mar. 1, 2021 and No. 2022-001735 filed Jan. 7, 2022, which are hereby incorporated by reference herein in their entirety.

What is claimed is:

1. An alloy member comprising:
   a substrate formed of an alloy containing Mg and Li;
   a first layer which is disposed on the substrate and contains an inorganic fluoride, the first layer having a plurality of pores, and
   a second layer which is disposed on the first layer and includes a cured product of a resin,
   wherein a maximum roughness Rz of a surface of the first layer on the side opposite the substrate is 1 μm or more, and
   wherein an average circle equivalent diameter of the plurality of pores is 2 μm or more in a cross section in a stacking direction.

2. The alloy member according to claim 1,
   wherein the plurality of pores includes at least one filled pore and at least one unfilled pore, and
   wherein the at least one filled pore is filled with the cured product of the resin.

3. The alloy member according to claim 2,
   wherein when a maximum thickness of the first layer is defined as t, the at least one filled pores is disposed up to, and not beyond, a position corresponding to 0.8t from the position at which the first layer and the second layer are in contact with each other in the stacking direction.

4. The alloy member according to claim 1,
   wherein the inorganic fluoride includes 90% by volume or more of $MgF_2$.

5. The alloy member according to claim 1,
   wherein the first layer has a thickness of 20 μm or more.

6. The alloy member according to claim 1,
   wherein in the alloy, a sum of a content of the Mg and a content of the Li is 90% by mass or more.

7. The alloy member according to claim 6,
   wherein the alloy further contains at least one element selected from the first group consisting of Al, Zn, Mn, Si, Ca, Ge, and Be, and
   wherein a sum of contents of the at least one element of the first group is 10% by mass or less.

8. The alloy member according to claim 7,
   wherein a content of the Al is 10% by mass or less,
   wherein a content of the Zn is 3% by mass or less,
   wherein a content of the Mn is 0.3% by mass or less,
   wherein a content of the Si is 0.2% by mass or less,
   wherein a content of the Ca is 1.0% by mass or less,
   wherein a content of the Ge is 1% by mass or less, and
   wherein a content of the Be is 3% by mass or less.

9. The alloy member according to claim 6,
   wherein the content of the Li is 0.5% by mass or more and 15% by mass or less.

10. A sliding member comprising the alloy member according to claim 1.

11. An apparatus comprising a casing; and
    a component disposed in the casing,
    wherein the casing includes the alloy member according to claim 1.

* * * * *